June 1, 1954   A. O. RYAN   2,680,084
HYDRAULIC CONVEYING
Filed July 19, 1948
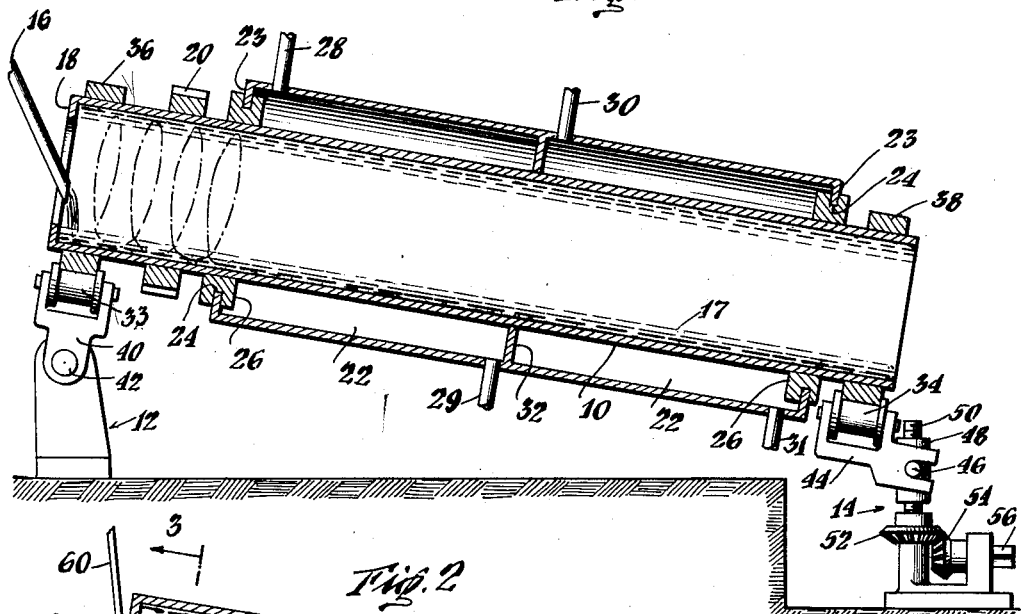
Fig. 1
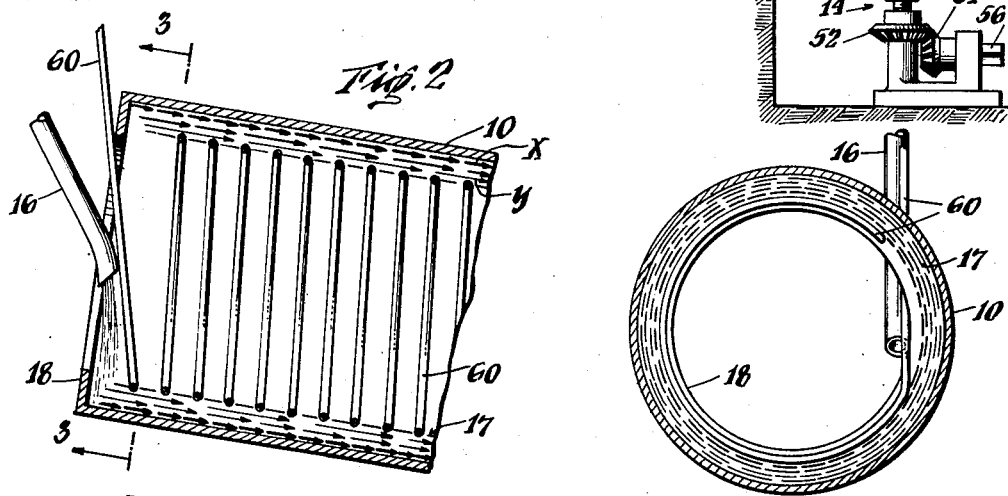
Fig. 2
Fig. 3
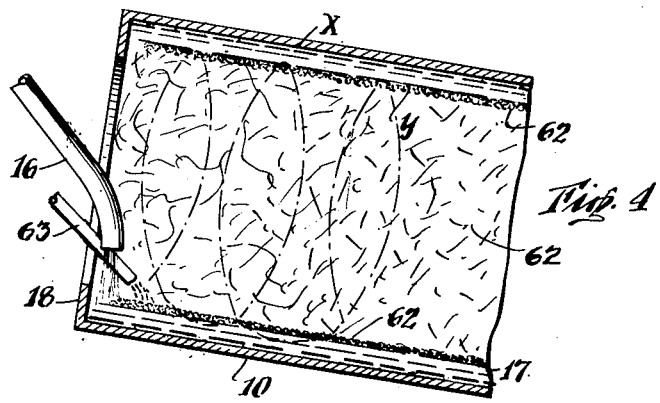
Fig. 4
INVENTOR.
Albert O. Ryan
BY
ATTORNEYS Patented June 1, 1954

2,680,084

UNITED STATES PATENT OFFICE 2,680,084

HYDRAULIC CONVEYING

Albert O. Ryan, Norwalk, Conn., assignor to Redding Manufacturing Company, Inc., Norwalk, Conn., a corporation of Delaware Application July 19, 1948, Serial No. 39,431

4 Claims. (Cl. 134—35)

This invention relates to method of handling material by advancing it through an extended path while moving a relatively short distance longitudinally.

In the processing of a wide variety of materials such for example as by heating, cooling, coagulating, washing, drying, vulcanizing and the like, extended conveyor means such for example as moving belts, or elongated baths, or ovens are employed which are undesirable because of the large amount of space which they require. Where the processing step must be continued for a substantial period of time this difficulty is increased since the material must either be moved through the treating zone very slowly, or else a very extended space must be employed in order to maintain a continuous operation.

It is accordingly an object of this invention to provide improved method of conveying material through an elongated path within a comparatively small space.

Another object of the invention is to provide a method whereby material may be continuously conveyed at high speed through an elongated path within a relatively small space.

Another object of the invention is to provide a method suitable for conveying a wide variety of materials both continuous and discontinuous in form.

Another object of the invention is to provide method in which the material may be advanced through an elongated path without being subject to tension thereby improving the quality and uniformity of the final product.

Another object of the invention is to provide a simple and practical method of the above mentioned kind.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a side elevational view partly in cross section;

Figure 2 is a side elevational fragmentary view corresponding to part of Figure 1 but on an enlarged scale, showing one form of material being conveyed;

Figure 3 is a cross sectional view taken on the line 3—3 of Figure 2; and

Figure 4 is a view similar to Figure 2 but showing another type of material being conveyed.

The numeral 10 indentifies a conduit which may be of any desired length. Conduit 10 is rotatably mounted on supports indicated generally as 12 and 14, support 12 being of somewhat greater height than support 14 so that the conduit is at least slightly inclined.

A supply pipe 16 is provided through which liquid 17 may be continuously introduced into the conduit. Supply pipe 16 is shown extending over an annular flange 18 provided at the upper end of the conduit. As more clearly shown in Figure 3 the supply pipe 16 is positioned so as to discharge into the conduit substantially tangentially with respect to the interior surface of the conduit.

The liquid 17 is employed to support or float the material to be conveyed and so the liquid 17, hereinafter referred to as the conveying liquid, should preferably be of higher specific gravity than the material to be conveyed, especially for conveying discontinuous material. It is essential that the flow of the liquid 17 through conduit 10 be non-turbulent and therefore desirably within the range of rates of flow for producing viscous flow of the conveying liquid. The rate of travel of the conveying liquid varies directly with its distance from the conduit wall and depends upon the viscosity of the liquid. Thus the rate of flow of the liquid increases in proportion to its distance from the wall of the conduit for any inclination of the conduit.

In Figure 2 the desirable condition of viscous flow of the conveying liquid within the conduit is schematically illustrated. The conveying liquid is retarded adjacent the inner surface by contact with the conduit wall whereas the portions successively near the inner surface of the liquid 17 will move successively faster, the portion at the inner surface represented by the arrows $y$ moving most rapidly and the portion adjacent the surface of the conduit indicated by the arrows $x$ moving slowest.

Conduit 10 is provided with an annular rack 20 adapted to be driven by a variable speed driving gear, not shown, actuated by any desirable source of power to rotate conduit 10. The rate of rotation will depend to some extent upon the diameter of the conduit, it being desired to rotate the conduit at a speed which is sufficient in relation to the diameter of the conduit to cause the conveying liquid 17 to be held against the interior surface of the rotating conduit and to rotate with the conduit while advancing by gravity longitudinally of the conduit. Thus conveying liquid is advanced through the conduit in the form of an annular body which rotates with the conduit. The conveying liquid thus advances linearly while rotating and the material which is being conveyed describes a helical path, the pitch of which will depend upon the angle of inclination of the conduit, the depth of liquid flowing with viscous flow, within the conduit, which is controlled by the amount of ilquid supplied into the conduit, and the viscosity of the liquid at a given temperature. If it is desired that successive turns of the said helical path be disposed close together axially of the conduit then the inclination of the conduit should be very slight and the spacing of the turns controlled preferably by controlling the amount of liquid supplied per unit of time.

In its simplest form the apparatus consists simply of the conduit, means for rotatably supporting the conduit, the conveying liquid therein, and means for rotating the conduit at controlled speed. In conjunction with the conveyor apparatus a wide variety of means may be employed for processing or conditioning material, the means varying with the particular material conveyed. Thus in conjunction with the conveyor there may be employed means for heating or cooling, wetting or drying, washing, vulcanizing or otherwise treating or processing or reacting chemically with material contained in the conduit. In the drawings an example of one means for heating or cooling the interior of the conduit is shown comprising a stationary jacket 22 extending around conduit 10 and having at its ends annular flanges 23 which extend into the annular grooves 24 provided in the outer periphery of annular bosses 26 extending around conduit 10 and form sealed joints therewith. Thus steam or hot water may be introduced into jacket 22 for heating the material in the conduit and for transferring heat to it through the conveying liquid, or cold water may be introduced thus cooling the conduit and its contents. As shown herein two separate sets of supply and return pipes 28 and 29, and 30 and 31 respectively are provided extending through jacket 22, on opposite sides of a partition 32 which serves to divide the space within jacket 22 into a plurality of portions thus making it possible to heat or cool the different portions to different temperatures. Thus in one embodiment of the invention the temperature of the conduit and its contents may be modified progressively.

The material being conveyed through the conduit may be heated or cooled in a variety of ways. For example it may be preheated and the conduit well insulated externally. The temperature of the material within the conduit may be modified by introducing a flow of a tempered gas or vapor into the conduit, intermediate its ends, or from one end; or the material may be heated by introducing steam, "dowtherm," or hot water into a surrounding jacket as has been described, or by high frequency induction heating, by infrared rays, by a stream of heated air, or inert gas, or by using the conduit itself as a low voltage resistance element.

The hydraulic conveyor may be applied for many and varied uses some of which will be mentioned by way of example. It may be employed as a continuous drier, and the material being conveyed may be dried by heat, or by contact with a hydroscopic liquid, such for example as glycerine. Or the conveyor means disclosed herein may be used as a continuous vulcanizer for which it is well adapted since the temperature and time of the operation may be readily controlled and varied and the material being processed is supported and free from tension, thus eliminating undesirable size variations. Or the conveyor means may be used for solvent extraction, as a continuous classifier or as a fractionating apparatus. Due to the inclination of conduit 10 there is a tendency for gases generated within the treating chamber to move upwardly in conduit 10, and this tendency is greatly increased by the application of heat to the container either uniformly along its entire length or differentially, and may be furthered by the introduction of a stream of air into the discharge end of the conduit for example.

The conveying liquid employed may be one which is capable of wetting, drying, coagulating, hardening, chemically reacting with or otherwise affecting or reacting with the material conveyed.

Various other processing steps may be performed on material while passing through conduit 10 depending upon the particular material being conveyed and the object of the treatment. And by introducing into the conduit two immiscible liquids of different specific gravities, one greater and the other less than the specific gravity of the material to be conveyed the material may be effectively covered and protected from contact with the air while passing through conduit 10. A similar result may be obtained by substituting an inert gas, preferably supplied from the discharge end of the conduit, for the liquid of less specific gravity than the material to be conveyed.

The conduit 10 may be supported on pairs of roller bearings 33 and 34 as by contact with ring bosses 36 and 38 on the conduit. The roller bearings are mounted on top of the support members 12 and 14. In order to control the rate of travel of the conveying liquid through conduit 10 means are provided for varying the inclination of the conduit. This may be accomplished in various ways but in the embodiment of the invention shown herein the roller bearings 33 supporting the front end of the conduit are mounted between the arms of a bifurcated member 40 which is pivotally connected as by pivot rod 42 to support member 12, and the roller bearings 34 for the rear end of the conduit are mounted between the arms of a bifurcated member 44 having a forked outer end engaging a stud 46 on collar 48 which is interiorly threaded to travel on the exteriorly threaded vertically disposed rod 50. Rod 50 in turn has mounted thereon a worm 52 engaged and driven by the worm 54 on shaft 56 which may be rotated by any suitable means (not shown) to cause collar 48 to ride up or down shaft 56 and thus change the inclination of conduit 10.

In Figure 2 the hydraulic conveyor disclosed herein is shown employed for conveying a continuous material, such for example as a continuous filament 60. In my Patent No. 2,402,846, issued June 25, 1946, which teaches one method of utilizing viscous flow in forming filaments, it is disclosed that any temperature-hardenable or chemically-hardenable material may be used. The term "filament" is used herein to denote broadly continuous lengths of thread forming substances without limitations as to cross sectional shape. The conveying liquid selected will preferably be one having a higher specific gravity than the filamentary material, although the filament 60 will remain and "float" upon the surface of the conveying liquid after being deposited thereon even when it is of the same, or of a somewhat lower specific gravity than the conveying liquid.

For conveying discontinuous materials, the density of the conveying liquid is important. Furthermore, if a second liquid, whether miscible or immiscible is utilized, in the conveyor to form a protecting liquid surface to exclude air, oxygen or undesirable atmosphere, the relative densities of the liquids and the material being conveyed are of such importance as to determine the choice of the liquids. However, the value of the relative densities becomes of secondary importance when only the conveying liquid is used, and may be completely counteracted by other forces due to existing conditions within the conveyor when processing a continuous filament i. e. tape, thread or the like to effect drying, extraction or evaporation of a solvent. Under these conditions the continuous filament must shrink uniformly in all directions unless otherwise restricted. The filament in the form of a helix is deposited on the inner surface of the conveyor liquid without tension when both are travelling at the same speed. If the inner liquid surface is travelling slightly faster than the continuous filament, a temporary, slight tension is developed sufficient to cause the filament to stay at the inner surface of the liquid. This tension may be either relieved by a small elongation of the filament or counter-balanced by surface tension forces.

Each helix or turn of the filament has a specific diameter because of its position on the inner surface of the conveyor liquid and any tendency to sink within the conveyor liquid would result in an increase of the helix diameter which cannot occur without a resulting permanent set or temporary elongation. Therefore the relative density of the conveyor liquid can be less than that of a continuous filament conveyed thereon. Shrinkage due to elimination of water or solvents counteracts any tendency to sink, and vulcanization, in the case of a rubber filament, results in higher tension which offsets any tendency to sink into the conveyor liquid. Such shrinkage is small enough to be harmless to the quality of the filaments yet large enough to permit the use of liquids of a density less than that of the continuous filaments being conveyed. Even if the shrinkage forces are large, the relative position of the helix turns are maintained by the surface tension forces in the conveyor liquid as it moves through the conduit.

Due to being carried around a spiral path by the advancing conveying liquid, the material being conveyed will be advanced through the conduit in a succession of helical turns. Since the conveying liquid 17 will be held by centrifugal force against the inner surface of the conduit in the form of a liquid layer and the filament 60 will be held on the surface of the conveying liquid, as the conduit is rotated the filament will describe a helix having a diameter corresponding with the inner diameter of the liquid layer, and it will advance continuously through the conduit in the form of a travelling helix.

As best shown in Figure 3 the filament 60 is introduced into the conduit on top of the layer of the conveying liquid 17 therein and preferably tangentially with respect to the surface of the liquid within the conduit so that when it is delivered onto the liquid it will be moving in substantially the same direction as the liquid. As stated above it may also be desirable, as for example when the filament or other continuous material is weak or newly formed and only partly hardened that the filament 60 be delivered onto the conveying liquid at a speed corresponding to the linear speed of the movement of the liquid to avoid tension on the filament or other continuous material. An important function of my hydraulic conveyor is to support filamentary material and relieve it from tension while it is being processed as my be desired. This may be accomplished by varying the speed of rotation of the conduit to synchronize the speed of the inner surface of the annular body of conveying liquid with the speed at which the material is supplied on the said surface.

In Figure 4 the hydraulic conveyor is shown applied for conveying a discontinuous material such, for example, as powdered or granular material 62. This material is also desirably introduced onto the conveying liquid tangentially at a speed corresponding to the linear speed of the conveying liquid, and it will be moved with the liquid through an extended helical path many times longer than the length of the conduit and may thus be subjected to processing steps or treatment for an extended period in a continuous operation performed within a relatively small space. In Figure 4 in addition to the supply pipe 16 through which the conveying liquid 17 is supplied to conduit 10, the supply pipe 63 is provided for introducing powdered or granular material, or the like, onto the layer of liquid 17 within conduit 10.

Continuous and non-continuous materials are referred to herein by way of example and not of limitation. It is to be understood that the hydraulic conveyor disclosed herein may be employed with widely different materials of many kinds.

It will thus be seen that there have been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. The method of advancing material through an extended path while moving a relatively short distance longitudinally, which comprises, causing a conveying liquid to travel down an inclined cylinder with viscous flow while rotating the cylinder to cause said liquid to be disposed as a layer over the interior surface of the cylinder, and to describe a spiral path while moving down the cylinder, and utilizing said spirally and non-turbulently moving liquid layer to support the said material and convey it through said extended path.

2. The method as claimed in claim 1 in which said material is discharged onto said conveying liquid while moving in substantially the same direction and at substantially the same speed as said spirally travelling conveying liquid.

3. The method of advancing material through an extended path while moving a relatively short distance longitudinally which comprises, causing a stream of liquid to flow down an inclined surface along a helical path and without turbulence, and utilizing said liquid as a conveyor for said material.

4. The method of handling material which comprises causing a conveying liquid to travel down an inclined cylinder with viscous flow while rotating the cylinder to cause the liquid to be disposed in a layer over the interior surface of the cylinder, and to describe a spiral path while moving down the cylinder, utilizing said spirally and non-turbulently moving liquid layer to support the material and convey it through an extended path thus provided, and while said material is being conveyed by said liquid subjecting it to the action of a modifying medium.

References Cited in the file of this patent

UNITED STATES PATENTS

| Number | Name | Date |
|---|---|---|
| 590,423 | Rademaker | Sept. 21, 1897 |
| 842,614 | Blass | Jan. 29, 1907 |
| 1,053,444 | Sellers | Feb. 18, 1913 |
| 1,284,488 | Steward | Nov. 12, 1918 |
| 1,401,212 | Vermaes | Dec. 27, 1921 |
| 1,633,839 | Hindshaw | June 28, 1927 |
| 1,801,263 | Burnette | Apr. 21, 1931 |
| 1,803,766 | O'Keeffe | May 5, 1931 |
| 2,046,434 | Touhey | July 7, 1936 |
| 2,057,338 | Malke | Oct. 13, 1936 |
| 2,072,598 | Kile | Mar. 2, 1937 |
| 2,104,102 | Ruthven | Jan. 4, 1938 |
| 2,158,689 | Buchanan | May 16, 1939 |
| 2,314,369 | Reed | Mar. 23, 1943 |
| 2,575,688 | Smith | Nov. 20, 1951 |
| 2,582,293 | Stanley | Jan. 15, 1952 |
| 2,593,555 | Guy | Apr. 22, 1952 |